Patented Dec. 8, 1953

2,662,020

UNITED STATES PATENT OFFICE 2,662,020

REFRACTORY VITREOUS CERAMIC COATING MATERIAL

Henry Zane Schofield and Loran S. O'Bannon, Columbus, Ohio, assignors, by mesne assignments, to United Aircraft Corporation, East Hartford, Conn., a corporation of Delaware No Drawing. Application May 26, 1950, Serial No. 164,604

10 Claims. (Cl. 106—48)

This invention relates to refractory vitreous ceramic coatings, and more particularly relates to a new refractory vitreous ceramic coating material characterized by the quantity of titania contained therein. This invention also relates to a new article of manufacture comprising a metallic layer and a layer of a ceramic coating material which has a large quantity of titania contained therein.

Engineering applications are requiring the use of structural materials which are operable at high temperatures in the order of 1600° F. to 1900° F. and higher; for example, in propulsion engines which operate at high temperatures. It has been found that the utility of metals at elevated operating temperatures may be increased by the application of ceramic coatings to such metals. A ceramic coating when applied to a metallic component of a power plant, such as a jet or rocket engine, may produce beneficial results in a variety of ways. These power plants may use fuel such as kerosene, leaded gasoline, and others, which upon burning yield products of combustion which can corrode various metallic components of these engines. The products of combustion of leaded gasoline are particularly corrosive to any exposed metallic parts which they contact. The metallic member coated with a ceramic material is protected from oxidation or corrosion and, consequently, the strength and ductility of the uncorroded material may be maintained for a longer period of time. This results in the raising of the operating temperature and life of a metallic member to the limits allowed by creep and stress rupture characteristics of the metal, rather than by the usually lower limits of oxidation and intergranular corrosion. In addition, most strength properties of a metallic member are beneficially affected by a coating of a ceramic material. Under conditions where the metallic member is heated on one side and cooled on the other, a ceramic coating on the hot side can materially reduce the heat flow and result in a significant reduction in the metal temperature. Such applications are numerous in jet engines where the hot working gases are contained by sheet-metal components. Furthermore, it is indicated that at elevated temperatures a vitreous refractory ceramic coating tends to equalize surface stresses in a metallic member and damp vibrations. Moreover, pronounced temperature gradients or "hot spots" which create damaging stresses in a metallic member are decreased in severity and variability by coating the metallic member with a ceramic material on the hot side thereof.

While the attendant advantages of the use of ceramic-coated metallic objects as components of jet engines have recently been recognized, difficulty has been encountered in developing satisfactory ceramic coating materials. Attempts have been made to employ conventional vitreous enamels for this purpose. Such conventional enamels, normally used for room-temperature service as in stove exteriors, interiors of refrigerators, and for chemical engineering equipment, lose adherence to the metals which they are supposed to protect, and themselves are damaged or destroyed by extended exposure to high temperatures in the range of 1600° F. to 1900° F.

It is, therefore, one object of this invention to provide a refractory vitreous ceramic coating which, when bonded to a metallic surface, will withstand operating temperatures above 1600° F.

It is another object of this invention to provide a frit used in preparing such a coating.

It is still another object of this invention to provide articles of manufacture comprising a metallic layer having bonded thereto a layer of this particular ceramic coating, and which when used as components of a propulsion engine will withstand operating temperatures in the range of 1600° F. to 1900° F.

It is a further object of this invention to provide a method of making such articles.

Various additional objects and advantages of this invention will be apparent from the following description.

In order to obtain, in accordance with this invention, a ceramic coating material which has utility above 1600° F., the composition of the frit should be kept within certain limits. The most important ingredients of the frit is titanium dioxide ($TiO_2$), and this constituent should be present in between 20% and 50% of the weight of the frit. It is immaterial whether the titanium dioxide is in the rutile or the anatase form. Equally satisfactory ceramic coatings have been prepared from frits which have contained titanium dioxide in either form. While the titanium dioxide may vary within the limits specified supra, an optimum result is obtained when the titanium dioxide in the frit is approximately 30% by weight of the frit.

The constituents of any conventional ground coat frit may be used as the balance of the components of the frit. However, it is preferred to use the following minerals as components of the frit: anhydrous borax ($Na_2O$—$2B_2O_3$), feldspar ($K_2O$—$Al_2O_3$—$6SiO_2$), quartz sand ($SiO_2$), soda ash ($Na_2CO_3$), soda nitre ($NaNO_3$), fluorspar ($CaF_4$), cobaltic oxide ($Co_2O_3$), manganese dioxide ($MnO_2$), and nickelous oxide (NiO). It is preferred that these materials be present in the frit in the following quantities based on the total weight of the frit: anhydrous borax, 10% to 20%; feldspar, 10% to 40%; quartz sand, 10% to 40%; soda ash, 3% to 15%; soda nitre, 2% to 4%; fluorspar, 2% to 4%; cobaltic oxide, 0.7% to 1.0%; manganese dioxide, 1.4% to 1.8%; and nickelous oxide, 0.7% to 1.0%. From routine computation, it is apparent that the foregoing composition can be expressed on an oxide basis as $Na_2O$ from 5% to 20%, $K_2O$ from 1% to 10%, CaO from 1% to 5%, CoO from 0.5% to 1%, NiO from 0.5% to 1.5%, $MnO_2$ from 0.5% to 2.0%, $SiO_2$ from 20% to 50%, $TiO_2$ from 20% to 50%, $Al_2O_3$ from 2% to 10%, $B_2O_3$ from 5% to 15%, based on the total weight of the frit.

The physical form of the various ingredients used to make the frit is not a necessary feature of this invention. However, it is preferred that they be in a relatively finely divided form, in order that the smelting time of the frit may be as short as possible. Moreover, quite satisfactory results have been obtained by using technical grade anhydrous borax, minus 35 mesh; whiteware grade feldspar, minus 200 mesh; technical grade quartz sand, minus 14 mesh; commercial grade soda ash (normally containing 58% $Na_2O$); commercial grade powdered soda nitre; commercial grade milled fluorspar; commercial pigment grade titanium dioxide; commercial grade powdered manganese dioxide (containing approximately 85% $MnO_2$); and commercial grade powdered nickelous oxide.

The raw frit batch is compounded by dry-mixing the above-recited ingredients within the proportions listed supra, and then smelting at an elevated temperature. While it is preferred to add the titania prior to smelting, the titania may be added either in whole or in part during milling of the frit and mill additions. The preferred smelting temperature is approximately 2500° F. However, the temperature of smelting and duration of time that the materials are held at the smelting temperature are not critical. In general, the desired product can be obtained by holding the frit at about 2500° F. for from 45 minutes to 1½ hours. However, longer or shorter times may be used depending upon the proportions of material used in the raw frit batch, and the weight of the batch. Thereafter the molten material is poured into a vat of water, thereby causing the material to shatter and thereby form a frit. The shattered frit is then dried, and crushed to —4 mesh in size.

The frit may then be made into a ceramic coating material in a manner well known to those skilled in the art. This is accomplished by adding enamel clay, commercial borax and magnesium carbonate, and water. The exact quantities of clay, commercial borax, magnesium carbonate, and water which are added to the frit, do not constitute the novelty of this invention, since these materials may be varied to obtain a vitreous refractory ceramic coating slip, having the particular application and working properties desired, as is well known to those skilled in the art.

To illustrate this invention and to enable one skilled in the art properly to perform the invention, the following examples are given. It is to be understood, however, that the purpose of these examples is merely illustrative in nature, and should in no way be construed as a limitation on the scope of the disclosure herein.

Frits having the following compositions were dry-mixed:

TABLE I

| | Examples—Percent by weight | | | | | | |
|---|---|---|---|---|---|---|---|
| | 1 | 2 | 3 | 4 | 5 | 6 | 7 |
| Anhydrous borax, $Na_2O2B_2O_3$ | 16.7 | 18.3 | 9.9 | 13.5 | 12.3 | 9.9 | 9.4 |
| Feldspar, $K_2OAl_2O_36SiO_2$ | 17.5 | 19.3 | 38.7 | 27.5 | 12.9 | 10.4 | 23.4 |
| Quartz sand, $SiO_2$ | 21.6 | 23.7 | 12.8 | 17.4 | 15.8 | 41.0 | 12.0 |
| Soda ash, $Na_2CO_3$ | 5.0 | 5.5 | 3.0 | 4.0 | 3.7 | 3.0 | 5.4 |
| Soda nitre, $NaNO_3$ | 3.4 | 3.8 | 2.0 | 2.7 | 2.5 | 2.0 | 2.5 |
| Fluorspar, $CaF_4$ | 3.4 | 3.8 | 2.0 | 2.7 | 2.5 | 2.0 | 1.9 |
| Titanium dioxide, $TiO_2$ | 29.1 | 22.1 | 28.3 | 28.7 | 46.7 | 28.3 | 37.4 |
| Cobaltic oxide, $Co_2O_3$ | 0.8 | 0.8 | 0.8 | 0.8 | 0.8 | 0.8 | 0.7 |
| Manganese dioxide, $MnO_2$ | 1.6 | 1.7 | 1.6 | 1.7 | 1.6 | 1.6 | 1.6 |
| Nickelous oxide, NiO | 0.9 | 1.0 | 0.9 | 1.0 | 0.9 | 0.9 | 0.9 |

In each of the above examples, the dry-mixed ingredients were smelted at a temperature of about 2500° F., and held at that temperature for about 45 minutes to 1½ hours. Thereafter, the molten material was poured into a vat of water, causing the material to shatter and thereby form a frit. The frit was then dried and crushed to —4 mesh in size.

In each of the above examples, for every 100 parts by weight of the frit, 7 parts of enamel clay, 0.54 part of commercial borax, 0.22 part of magnesium carbonate, and 73 parts of water were milled in conventional porcelain ball mills, to a fineness of less than 5 grams retained on a 200 mesh sieve, from an initial sample of 100 cc. of slip. In some cases, the ceramic coating material was milled to a fineness of none on a 200 mesh sieve and only traces were retained on a 325 mesh sieve.

The terminology of such a specification is well known in the enamel and paint industry and implies that 100 cc. of milled ceramic coating material were washed through a 200 mesh sieve, or a 325 mesh sieve as the case may be, the sieve then dried and shaken on a Tyler Rotap machine for five minutes. The residue was weighed and reported as "grams retained."

All ceramic coating materials prepared from the frits of the above examples, when bonded to a properly prepared metallic surface, produced extremely useful results.

Of course, various combinations of frits may be used to obtain a single ceramic coating material of a desired composition, as is well known to those skilled in the art, whereby to produce a satisfactory refractory vitreous ceramic coating on a metallic member.

Moreover, a mixture of a titania-containing frit and titania, sufficient to bring the total titania content within the range constituting this invention based on the weight of the frit and titania components may be sprinkled while dry on a prepared, hot, metallic surface in order to obtain a refractory, vitreous, ceramic coated article. Such a dry mixture may also be incorporated in an organic suspension medium.

A part of the subject matter of this invention is a new article of manufacture comprising a metallic layer and a ceramic coating layer, wherein the ceramic coating has between 20% and 50% titanium dioxide. This invention also relates to the method of making such a product. Such an article of manufacture, when used as a part of a jet or rocket engine materially increases the life thereof.

In order that the ceramic coating material may be bonded to a metallic surface, it is necessary that the metallic surface first be prepared. While the metallic surface may be prepared in a variety of ways, a very satisfactory manner of preparing the metallic surface is as follows: The metallic surface is first sand-blasted to a satin finish. Silicon carbide grit, —14 mesh in size, may be used for the cleaning operation. Quartz sand, —14 mesh in size, may also be used. Following the sand-blasting operation, the metal is thoroughly scrubbed with carbon tetrachloride to remove any grease or silicon carbide dust retained after sand-blasting. When the metallic surface has thoroughly dried, the ceramic coating may then be applied. This may be accomplished either by dipping or by spraying or any other satisfactory means.

Coatings on sheet metal in the range of 16 gauge will mature very satisfactorily when heated for 15 minutes at a temperature of 1920° F. By varying the firing time, the firing temperature may be varied from 1800° F. to 2000° F. The thickness of the metal will also occasion a varying of the time.

Jet engine turbine or compressor parts, either moving or stationary, and burner and afterburner parts, when coated in the above manner with this ceramic coating material result in an increase in life of the particular coated part, of as much as 50% when leaded gasoline is used as a fuel.

While this invention has been described in its preferred embodiment, it is to be understood that the words used are words of description rather than of limitation, and that changes within the purview of the appended claims may be made without departing from the true scope and spirit of the invention.

We claim:

1. A frit, used in making a refractory vitreous ceramic coating material capable of withstanding prolonged exposure to temperatures in excess of 1600° F., comprising from 20% to 50% titania and the balance essentially the constituents of a conventional ground-coat frit of the feldspar-borax-quartz type.

2. A frit, used in making a refractory vitreous ceramic coating material capable of withstanding prolonged exposure to temperatures in excess of 1600° F., comprising about 30% titania and the balance essentially the constituents of a conventional ground-coat frit of the feldspar-borax-quartz type.

3. A refractory vitreous ceramic coating material, capable of withstanding prolonged exposure to temperatures in excess of 1600° F. and comprising a titania-containing frit containing the constituents of a conventional ground-coat frit of the feldspar-borax-quartz type, together with sufficient titania to bring the total titania content within the range of 20% to 50% by weight of the combined frit and titania components.

4. A refractory vitreous ceramic coating material, capable of withstanding prolonged exposure to temperatures in excess of 1600° F., and including an electrolyte, clay, and water, and a titania-containing frit containing the constituents of a conventional ground-coat frit of the feldspar-borax-quartz type, together with sufficient titania to bring the total titania content within the range of 20% to 50% by weight of the combined frit and titania components.

5. A frit used in making a refractory vitreous ceramic coating material and containing about:

|  | Percent |
| --- | --- |
| $Na_2O$ | From 5 to 20. |
| $K_2O$ | From 1 to 10. |
| $CaO$ | From 1 to 5. |
| $CoO$ | From 0.5 to 1. |
| $NiO$ | From 0.5 to 1.5. |
| $MnO_2$ | From 0.5 to 2.0. |
| $SiO_2$ | From 20 to 50. |
| $TiO_2$ | From 20 to 50. |
| $Al_2O_3$ | From 2 to 10. |
| $B_2O_3$ | From 5 to 15. | based on the total weight of the frit.

6. A refractory vitreous ceramic coating material made from a frit containing about:

|  | Percent |
| --- | --- |
| $Na_2O$ | From 5 to 20. |
| $K_2O$ | From 1 to 10. |
| $CaO$ | From 1 to 5. |
| $CoO$ | From 0.5 to 1. |
| $NiO$ | From 0.5 to 1.5. |
| $MnO_2$ | From 0.5 to 2.0. |
| $SiO_2$ | From 20 to 50. |
| $TiO_2$ | From 20 to 50. |
| $Al_2O_3$ | From 2 to 10. |
| $B_2O_3$ | From 5 to 15. | based on the total weight of the frit.

7. A refractory vitreous ceramic coating material, capable of withstanding prolonged exposure to temperatures in excess of 1600° F. and comprising a titania-containing frit together with sufficient titania to bring the composition of the resulting material within the following ranges:

|  | Percent |
| --- | --- |
| $Na_2O$ | From 5 to 20. |
| $K_2O$ | From 1 to 10. |
| $CaO$ | From 1 to 5. |
| $CoO$ | From 0.5 to 1. |
| $NiO$ | From 0.5 to 1.5. |
| $MnO_2$ | From 0.5 to 2.0. |
| $SiO_2$ | From 20 to 50. |
| $TiO_2$ | From 20 to 50. |
| $Al_2O_3$ | From 2 to 10. |
| $B_2O_3$ | From 5 to 15. | based on the total weight of the frit and titania components.

8. The method of making a refractory vitreous ceramic coated metallic article, which comprises smelting a raw batch mixture of refractory vitreous ceramic coating forming ingredients, and characterized by being able to yield from the smelt a frit containing about:

|  | Percent |
| --- | --- |
| $Na_2O$ | From 5 to 20. |
| $K_2O$ | From 1 to 10. |
| $CaO$ | From 1 to 5. |
| $CoO$ | From 0.5 to 1. |
| $NiO$ | From 0.5 to 1.5. |
| $MnO_2$ | From 0.5 to 2.0. |
| $SiO_2$ | From 20 to 50. |
| $TiO_2$ | From 20 to 50. |
| $Al_2O_3$ | From 2 to 10. |
| $B_2O_3$ | From 5 to 15. | based on the total weight of the frit, milling a slip containing said frit, coating the metallic object with said slip, and burning the same.

9. The method of making a refractory vitreous ceramic coated metallic article which comprises adding to a titania-containing frit sufficient titania to bring the composition of the resulting material within the following ranges:

| | Per cent |
|---|---|
| $Na_2O$ | From 5 to 20. |
| $K_2O$ | From 1 to 10. |
| $CaO$ | From 1 to 5. |
| $CoO$ | From 0.5 to 1. |
| $NiO$ | From 0.5 to 1.5. |
| $MnO_2$ | From 0.5 to 2.0. |
| $SiO_2$ | From 20 to 50. |
| $TiO_2$ | From 20 to 50. |
| $Al_2O_3$ | From 2 to 10. |
| $B_2O_3$ | From 5 to 15. | based on the weight of the combined frit and titania components, milling a slip containing said frit and titania components, coating the metallic object with said slip, and burning the same.

10. An article of manufacture comprising a metallic layer and in intimate adherence therewith a layer of a refractory vitreous ceramic coating material formed from a frit containing about:

| | Per cent |
|---|---|
| $Na_2O$ | From 5 to 20. |
| $K_2O$ | From 1 to 10. |
| $CaO$ | From 1 to 5. |
| $CoO$ | From 0.5 to 1. |
| $NiO$ | From 0.5 to 1.5. |
| $MnO_2$ | From 0.5 to 2.0. |
| $SiO_2$ | From 20 to 50. |
| $TiO_2$ | From 20 to 50. |
| $Al_2O_3$ | From 2 to 10. |
| $B_2O_3$ | From 5 to 15. | based on the total weight of the frit.

HENRY ZANE SCHOFIELD.
LORAN S. O'BANNON.

References Cited in the file of this patent

UNITED STATES PATENTS

| Number | Name | Date |
|---|---|---|
| 1,925,560 | Kinzie et al. | Sept. 5, 1933 |
| 2,209,585 | Stuckert | July 30, 1940 |
| 2,332,424 | Zwermann | Oct. 19, 1943 |
| 2,514,855 | Goetchius et al. | July 11, 1950 |

FOREIGN PATENTS

| Number | Country | Date |
|---|---|---|
| 9,611 | Great Britain | 1893 |
| 336,797 | Great Britain | 1930 |
| 526,944 | France | 1921 |
| 688,787 | Germany | 1940 |
| 48,146 | Norway | 1930 |
| 218,086 | Switzerland | 1942 |